(12) United States Patent
Deguchi et al.

(10) Patent No.: US 7,012,865 B2
(45) Date of Patent: Mar. 14, 2006

(54) RECORDING APPARATUS AND RECORDING METHOD

(75) Inventors: Hironori Deguchi, Osaka (JP); Makoto Usui, Osaka (JP); Kohei Nakata, Osaka (JP)

(73) Assignee: Matsushita Electric Industrial Co., Ltd., Kadoma (JP)

( * ) Notice: Subject to any disclaimer, the term of this patent is extended or adjusted under 35 U.S.C. 154(b) by 509 days.

(21) Appl. No.: 10/136,068

(22) Filed: May 1, 2002

(65) Prior Publication Data

US 2003/0002406 A1    Jan. 2, 2003

(30) Foreign Application Priority Data

May 8, 2001    (JP) ............................. 2001-137013

(51) Int. Cl.
G11B 7/00    (2006.01)

(52) U.S. Cl. .................. 369/47.3; 369/47.48
(58) Field of Classification Search ............... 369/47.1, 369/47.22, 47.28, 47.27, 47.3, 47.31, 47.48
See application file for complete search history.

(56) References Cited

U.S. PATENT DOCUMENTS 6,324,136 B1 * 11/2001 Yoshida et al. .......... 369/47.22
6,522,608 B1 *  2/2003 Kuroda .................... 369/47.28

FOREIGN PATENT DOCUMENTS

| JP | 11-203785   | 7/1999  |
| JP | 2000-187947 | 7/2000  |
| JP | 2000-298955 | 10/2000 |

* cited by examiner

Primary Examiner—Nabil Hindi
(74) Attorney, Agent, or Firm—Renner, Otto, Boisselle & Sklar, LLP

(57) ABSTRACT

An optical disc apparatus includes a recording section for recording new data on an optical disc so as to be continuous to data which is previously recorded on the optical disc; a detection section for detecting an amount of deviation between a position at which the previously recorded data is recorded and a position at which the previously recorded data should have been recorded; and an adjustment for adjusting a position at which the new data is to be recorded so that an amount of deviation between a position at which an end of the new data is to be recorded and a position at which the end of the new data should be recorded is smaller than the amount of deviation detected by the detection section.

13 Claims, 13 Drawing Sheets

FIG.11

|  | bit0 | bit1-4 | bit5-12 |  |
|---|---|---|---|---|
|  | SYNC | RA | DATA |  |
| 0 |  | 0000b | 1st byte of ECC Block address | Part A |
| 1 |  | 0001b | 2nd byte of ECC Block address |  |
| 2 |  | 0010b | 3rd byte of ECC Block address |  |
| 3 |  | 0011b | 1st byte of Parity A |  |
| 4 |  | 0100b | 2nd byte of Parity A |  |
| 5 |  | 0101b | 3rd byte of Parity A |  |
| 6 |  | 0110b | Field ID (00h) |  |
| 7 |  | 0111b | 1st byte of ECC Block address | Part B |
| 8 |  | 1000b | 2nd byte of ECC Block address |  |
| 9 |  | 1001b | 3rd byte of ECC Block address |  |
| 10 |  | 1010b | reserved |  |
| 11 |  | 1011b | reserved |  |
| 12 |  | 1100b | reserved |  |
| 13 |  | 1101b | 1st byte of Parity B |  |
| 14 |  | 1110b | 2nd byte of Parity B |  |
| 15 |  | 1111b | 3rd byte of Parity B |  |

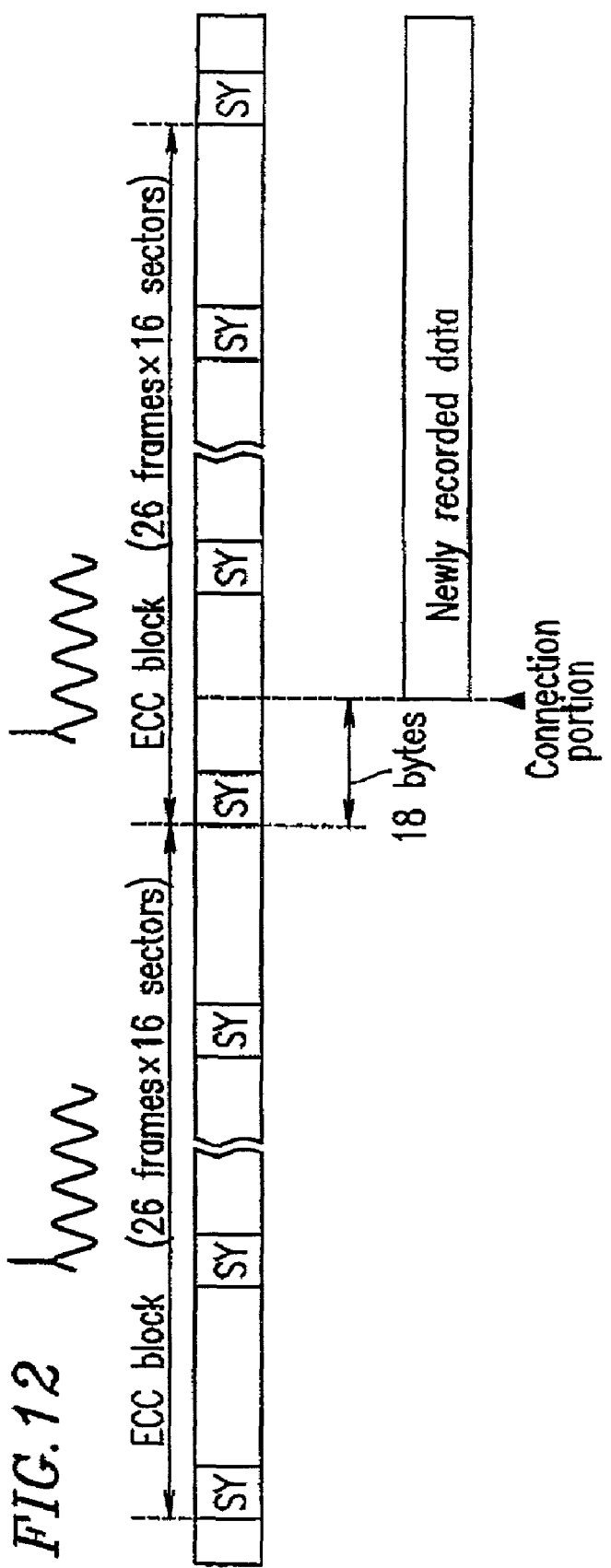

RECORDING APPARATUS AND RECORDING METHOD

BACKGROUND OF THE INVENTION

1. Field of the Invention

The present invention relates to an optical disc apparatus for recording data on an optical disc.

2. Description of the Related Art

Recently, various types of optical disc apparatuses for recording or reproducing data using a light beam have been developed. As write once type optical discs, CD-R/RW discs, DVD-RAM discs, DVD-R/RW discs have been, for example, developed.

A DVD-R/RW has a convexed pit referred to as a "pre-pit" in each of land tracks interposing groove tracks (land pre-pit). A land pre-pit is detected by level-slicing a push-pull signal at a prescribed slicing level. The push-pull signal is obtained when the groove track is irradiated with a light beam.

In order to obtain a recording clock signal in synchronization with a linear velocity of the rotating optical disc which is rotating, the track is waved at a prescribed cycle. This wave is referred to as a "wobble". Wobbles are located so as to have a prescribed phase relationship with the land pre-pits. Like the land pre-pit, the wobble is also detected by level-slicing a push-pull signal at a prescribed slicing level. By detecting the frequency of the wobbles and multiplying the frequency by a prescribed value, a recording clock signal corresponding to a unit time length of a recording mark can be obtained.

In general, data is recorded on a DVD-R/RW disc in synchronization with a recording clock signal obtained from the wobbles based on the land pre-pit signal. In the case where data is already recorded on the DVD-R/RW disc, very highly precise recording position control is required so that there is no gap or discontinuity between the previously recorded data and the newly recorded data.

The DVD-R/RW disc has a track pitch of 0.74 $\mu$m, which is half of the track pitch of a CD-R/RW disc of 1.6 $\mu$m. The CD-R/RW disc is another write once type optical disc. Due to such a narrow track pitch, in the DVD-R/RW disc, the influence of interference from tracks adjacent to the track of interest (i.e., crosstalk) is highly noticeable. A fluctuation in the wobble amplitude and phase caused by the crosstalk affects, in the form of jitters, the recording clock obtained by multiplying the frequency of the wobbles by a prescribed value. The recording clock extracted from the wobbles is mainly used for generating a recording timing signal for the purpose of, for example, synchronization of recording data. Therefore, the jitters in the recording clock may undesirably deviate the recording position.

A land pre-pit signal itself involves a jitter component due to, for example, interference with the recording mark which is already recorded, and a difference between the power of the light beam in the state of forming a recording mark for the purpose of recording and the light beam in other states.

For these reasons, recording of data which is performed after the recording timing signal is determined based on the land pre-pit signal may result in the previously recorded data and the newly recorded data being undesirably discontinuous. Such discontinuity affects bit synchronization or frame synchronization which is performed for reproduction. As a result, the connection portion between the previously recorded data and the newly recorded data cannot be reproduced in a superb manner.

In order to solve this problem, Japanese Laid-Open Publication No. 2000-187947 titled "Optical disc recording apparatus" proposes an optical disc of a system for reproducing a synchronization signal included in the previously recorded data and adjusting a timing of recording the data to be newly recorded based on the synchronization signal.

Depending on the influence of the crosstalk or the difference between the states of recording, a reproduction clock obtained from the previously recorded data and a reproduction clock obtained from the newly recorded data may have different frequencies or phases.

In such a case, there is a problem in that the connection portion between the previously recorded data and the newly recorded data cannot be reproduced in a superb manner until the frequency of the reproduction clock is stabilized.

In order to solve this problem. Japanese Laid-Open Publication No. 2000-298955 titled "Information recording apparatus and information recording method" proposes an optical disc of a system for synchronizing the frequency or phase of a recording clock to the frequency or phase of the reproduction clock of the previously recorded data and then, after the recording operation starts, recovering the frequency or phase of the recording clock to the original frequency or phase at a prescribed time constant.

However, the optical discs described in the above-described publications have the following problems.

In the system for reproducing a synchronization signal included in the previously recorded data and adjusting the timing of recording the data to be newly recorded based on the synchronization signal, the positional deviation of the previously recorded data remains in the newly recorded data.

The system for synchronizing the frequency or phase of a recording clock to the frequency or phase of the reproduction clock of the previously recorded data and then, after the recording operation starts, recovering the frequency or phase of the recording clock to the original frequency or phase at a prescribed time constant, involves the following problem. Frequency errors of the recording clock, which are generated in a transition state in which the frequency or phase of the recording clock changes after the recording operation starts, are accumulated. Thus, a timing error is generated at a recording position. As a result, a positional deviation occurs for the newly recorded data.

The amounts of deviation of recording position are Accumulated each time data is additionally written and may result in a significant deviation.

SUMMARY OF THE INVENTION

According to one aspect of the invention, an optical disc apparatus includes a recording section for recording new data on an optical disc so as to be continuous to data which is previously recorded on the optical disc, a detection section for detecting an amount of deviation between a position at which the previously recorded data is recorded and a position at which the previously recorded data should have been recorded: and an adjustment section for adjusting a position at which the new data is to be recorded so that an amount of deviation between a position at which an end of the new data is to be recorded and a position at which the end of the new data should be recorded is smaller than the amount of deviation detected by the detection section.

In one embodiment of the inventions the adjustment section adjusts the position at which the new data is to be recorded so that the amount of deviation between the position at which the end of the new data is to be recorded and the position at which the end of the new data should be recorded is substantially zero.

In one embodiment of the invention, the recording section records the new data on the optical disc in synchronization with a recording clock. The adjustment section adjusts a frequency of the recording clock so as to adjust the position at which the new data is to be recorded.

In one embodiment of the invention the optical disc apparatus further includes reference frequency detection section for detecting a reference frequency of the recording clock, wherein the adjustment section control the frequency of the recording clock so that the frequency of the recording clock approaches the reference frequency.

According to another aspect of the invention, an optical disc apparatus includes a pre-pit sync detection circuit for detecting a prescribed pre-pit pre-formed on an optical disc and outputting a pre-pit sync detection signal in response to detection of the prescribed pre-pit; a data sync detection circuit for detecting a prescribed synchronization signal included in the previously recorded data and outputting a data sync detection signal in response to detection of the synchronization signal a recording clock generation circuit for generating a recording clock; and a recording circuit system for recording the new data on the optical disc in synchronization with the recording clock based on the data sync detection signal. The recording clock generation circuit detects a time-wise amount of deviation between the pre-pit sync detection signal and the data sync detection signal and controls a frequency of the recording clock so as to correct the detected time-wise amount of deviation.

In one embodiment of the invention, the recording clock generation circuit includes a first timing signal generator for generating a first rectangular wave in synchronization with the recording clock based on the pre-pit sync detection signal; a second timing signal generator for generating a second rectangular wave in synchronization with the recording clock based on the data sync detection signal; and a control circuit for controlling the frequency of the recording clock so that a phase difference between the first timing signal and the second timing signal approaches zero.

In one embodiment of the invention, the first timing signal generator generates the first rectangular wave by dividing the frequency of the recording clock. The second timing signal generator generates the second rectangular wave by dividing the frequency of the recording clock.

In one embodiment of the invention, the recording clock generation circuit includes a first timer which is preset at a first prescribed value in response to the pre-pit sync detection signal; a second timer which is preset at a second prescribed value in response to the data sync detection signal; and a control circuit for controlling the frequency of the recording clock so that a difference between a value of the first timer and a value of the second timer approaches zero.

In one embodiment of the invention, the first timer and the second timer operate in synchronization with the recording clock.

In one embodiment of the invention, the optical disc has a track formed thereon having wobbles of a prescribed cycle the optical disc apparatus further comprising a wobble detection circuit for detecting the wobbles and outputting a wobble signal representing a frequency of the wobbles, wherein the recording clock generation circuit controls the frequency of the recording clock in accordance with the wobble signal.

In one embodiment of the invention, the recording clock generation circuit controls the frequency of the recording clock in accordance with the wobble signal before recording of the new data is started; and controls the frequency of the recording clock in accordance with the wobble signal and the detected time-wise amount of deviation after the recording of the new data is started.

In one embodiment of the invention, the optical disc apparatus further includes a reproduction clock generation circuit for generating a reproduction clock from the previously recorded data, wherein the recording clock generation circuit controls the frequency of the recording clock in accordance with the reproduction clock before recording of the new data is started; and controls the frequency of the recording clock in accordance with the wobble signal and the detected time-wise amount of deviation after the recording of the new data is started.

Thus, the invention described herein makes possible the advantages of providing an optical disc apparatus for preventing amounts of deviation of recording position from being accumulated while guaranteeing continuity between previously recorded data and newly recorded data.

These and other advantages of the present invention will become apparent to those skilled in the art upon reading and understanding the following detailed description with reference to the accompanying figures.

BRIEF DESCRIPTION OF THE DRAWINGS

FIG. 11 shows a structure of 13-bit information (1-bit sync code and 12-bit LPP information);

FIG. 12 is a timing diagram for recording data on a DVD-R/RW disc having data already recorded thereon;

DESCRIPTION OF THE PREFERRED EMBODIMENTS

As an example of an optical disc usable for recording and reproduction performed by an optical disc apparatus according to the present invention, an optical disc conforming to the DVD-R/RW (Digital Versatile Disc-Recordable/Re-Recordable) Standards will be described.

Figure 10:
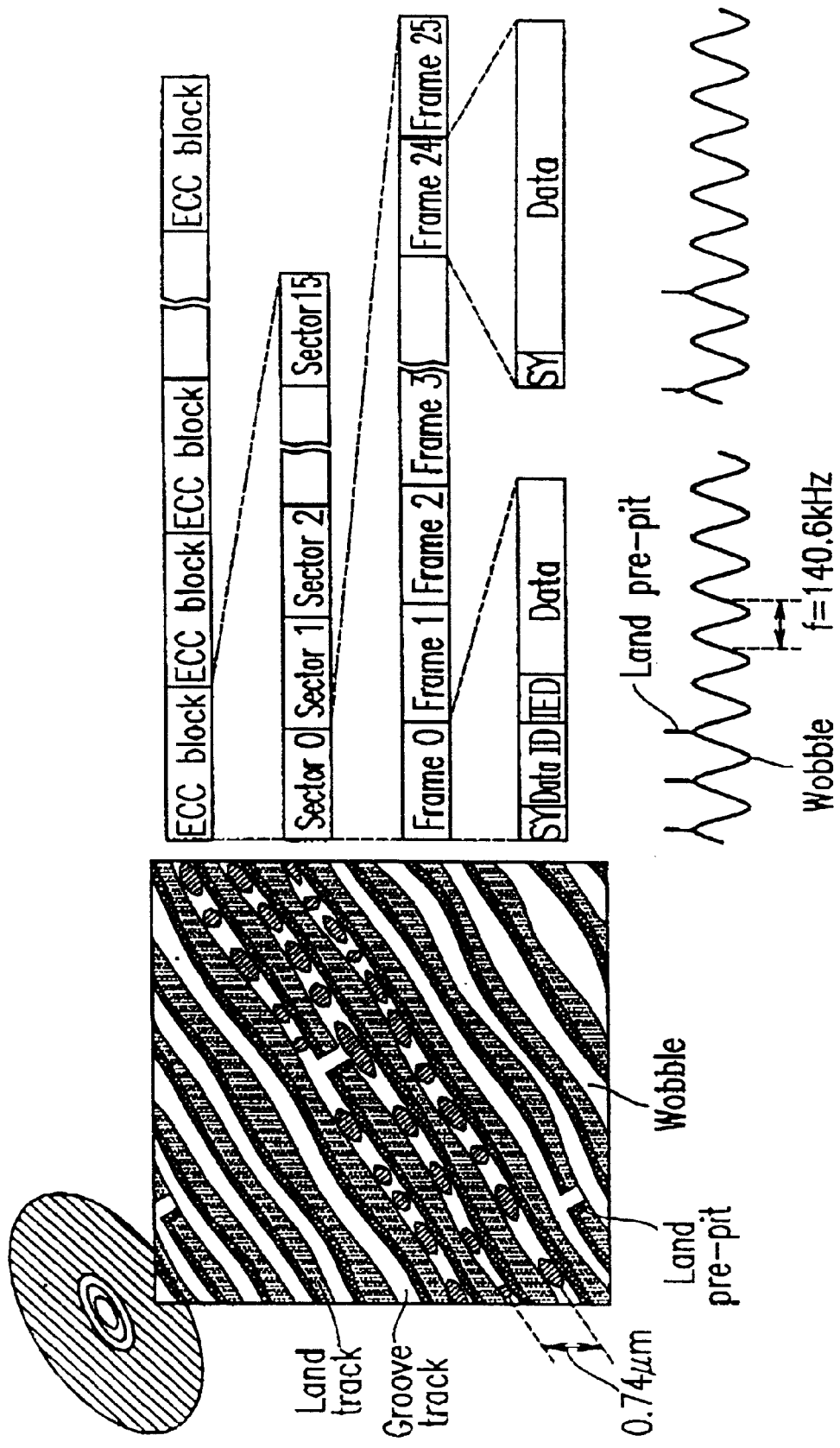
FIG. 10 shows a structure of an optical disc conforming to the DVD-R/RW Standards.

FIG. 10 shows a structure of an optical disc conforming to the DVD-R/RW Standards.

The optical disc has a recording groove (groove track) spirally formed on a surface thereof. When the groove track is irradiated with a light beam, the optical characteristics of the recording film of the groove track change. As a result, a recording mark is formed on the groove track. Thus, the data is recorded on the groove track. The recording film is formed of an organic colorant or a phase change material.

Data recorded on the optical disc includes at least one ECC (Error Correction Code) block. An ECC block is a minimum unit for error correction.

An ECC block includes 16 sectors (sectors 0 through 15). The 16 sectors each include 26 frames (frames 0 through 25).

The 26 frames each include a 2-byte synchronization signal (SY) and 1488T data (i.e., a 32T sync code and a 1456T data code). The 32T sync code and the 1456T data code are obtained by performing 8–16 modulation of 91-byte data. Here, "1T" refers to a unit time length of a recording mark. "1T" corresponds to 38.2 ns (1/(26.16 MHz)) at the standard speed of the DVD-R/RW.

A sync code is a code including "a recording mark having a length of 14T and a space having a length of 4T" or a code including "a space having a length of 14T and a code having a length of 4T". Here, a "space" refers to an area interposed between two adjacent recording marks.

A leading frame (frame 0) of each sector includes 4-byte address information referred to as a data ID and a 2-byte ID error detection code referred to as an IED (ID Error Detection Code).

A groove track is waved at a prescribed cycle (wobbles). Wobbles have a frequency of about 140.6 kHz at the standard speed of the DVD-R/RW. By multiplying the frequency of the wobbles by 186 (140.6 kHz×186=26.16 MHz), a clock signal having the unit time length of the recording mark is obtained. In other words, 1 wobble has 186T, and 1 frame (1488T) includes 8 wobbles.

The optical disc has pits referred to as land pre-pits (LPP) on a land track between two adjacent groove tracks. The land pre-pits are used as a positional reference for recording and physical address information. The land pre-pits are formed during the production of the optical disc.

A land pre-pit is convexed toward the light beam directed thereto. A land pre-pit is corresponded to the groove track which is immediately adjacent thereto and closer to the center of the optical disc than the land pre-pit. The land pre-pit is located at the apex of a wobble of the groove track corresponding thereto.

Among the 26 frames included in each sector, even-numbered frames are referred to as "EVEN frames", and odd-numbered frames are referred to as "ODD frames". Especially, the leading frame (frame 0) of the sector is referred to as an "EVEN sync frame", and the second frame (frame 1) of the sector is referred to as an "ODD sync frame".

In principle, LPP codes obtained by the conversion shown in Table 1 are located at the apexes of the first three wobbles among the eight wobbles included in each EVEN frame. In the case where the LPP code on the inner side of a groove track is different from the LPP code on the outer side of the groove track, the LPP code on the outer side of the groove track is exceptionally shifted to the ODD frame. This is done in order to prevent crosstalk between two adjacent LPP codes.

By converting the 13 LPP codes included in each sector using Table 1, 13-bit information (a 1-bit sync code and 12-bit LPP information) is obtained for each sector.

TABLE 1

| bit 2 | bit 1 | bit 0 | Meaning of bit 2/1/0 combination |
|---|---|---|---|
| 1 | 1 | 1 | EVEN sync |
| 1 | 1 | 0 | ODD sync |
| 1 | 0 | 1 | data "1" |
| 1 | 0 | 0 | data "0" |

FIG. 11 shows a structure of the 13-bit information (a 1-bit sync code and 12-bit LPP information). The 13-bit information is defined for each ECC block (16 sectors) The first 4 bits (bit 1 throughout 4) of the 12-bit LPP information is referred to as an "RA" (Relative Address) and represents a sector number in the ECC block. The remaining 8 bits (bit 5 through bit 12) of the 12-bit LPP information represents two sets of ECC block addresses (hereinafter, referred to as "pre-pit addresses") and two sets of error correction codes (parities) for the ECC block.

FIG. 12 shows the timing for recording data on an optical disc conforming to the DVD-R/RW Standards. According to the DVD-R/RW standards, data is recorded in units of ECC blocks. The position at which the data recording is started is rearward by 18 bytes with respect to the border between two adjacent ECC blocks. The position at which the data recording is finished is also rearward by 18 bytes with respect to the border between two adjacent ECC blocks. Thus, the end of the previously recorded data is rearward by 18 bytes with respect to the border between two adjacent ECC blocks. Therefore, new data is recorded from the position which is rearward 18 bytes with respect to the border between the two adjacent ECC blocks. Then, no discontinuity occurs between the previously recorded data and the newly recorded data.

The new data is recorded on a groove track so that the circumference position on the groove track, at which the center of the 14T-long mark or space included in the sync code of the new data is located matches the circumferential position of the land pre-pit on the land track adjacent to the groove track.

Recording new data in connection to the previously recorded data is referred to as "linking". In order to perform linking so that discontinuity will not occur at the connection portion between the previously recorded data and the newly recorded data, it is required to control the recording position at a very high level of precision.

Figure 13A:
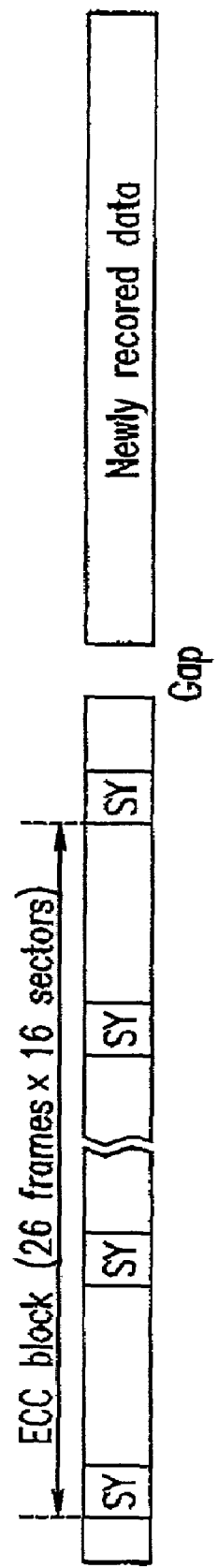
FIG. 13A shows linking in the case where previously recorded data is deviated forward with respect to the position at which the data should have been recorded.

FIG. 13A shows linking in the case where the previously recorded data is deviated forward with respect to the position at which the data should have been recorded. In this case, a gap is made between the previously recorded data and the newly recorded data.

Figure 13B:
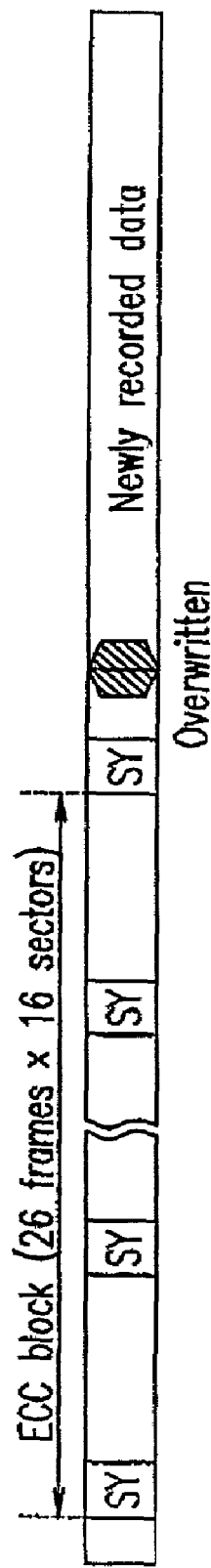
FIG. 13B shows linking in the can be where previously recorded data is deviated rearward with respect to the position at which the data should have been recorded.

FIG. 13B shows linking in the case where the previously recorded data is deviated rearward with respect to the position at which the data should have been recorded. In this case, overwrite occurs at the connection portion between previously recorded data and the newly recorded data.

Hereinafter, the present invention will be described by way of illustrative examples with reference to the accom-

EXAMPLE 1

An optical disc apparatus 100 according to a first example of the present invention will be described with reference to FIGS. 1 through 7.

Figure 1:
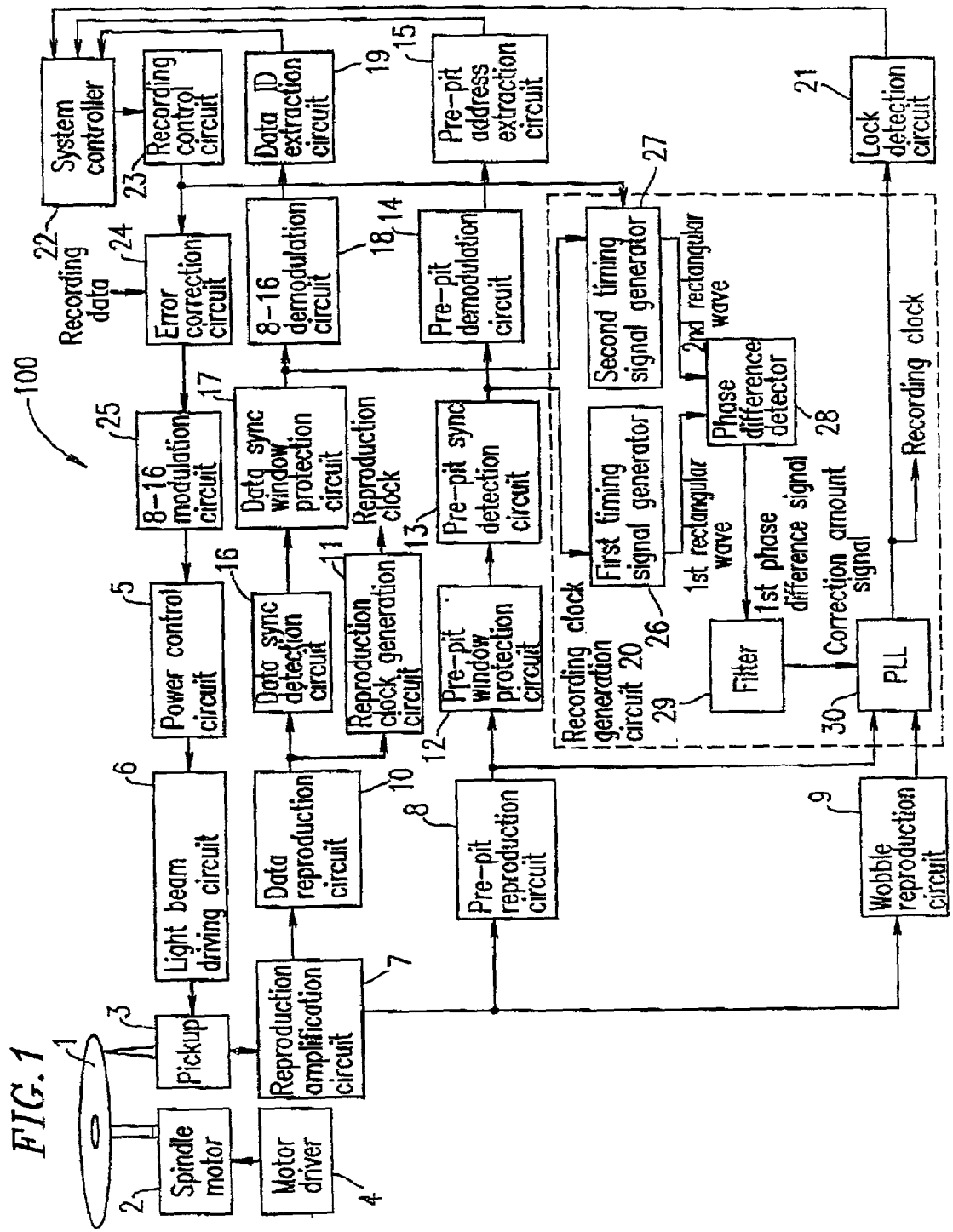
FIG. 1 is a block diagram illustrating a structure of an optical disc apparatus 100 according to a first example of the present invention.

FIG. 1 shows a structure of the optical disc apparatus 100.

The optical disc apparatus 100 records information on an optional disc 1 or reproduces information recorded on the optical disc 1. The optical disc apparatus 100 includes a spindle motor 2, a pickup 3, a motor driver 4, a power control circuit 5, a light beam driving circuit 6, a reproduction amplification circuit 7, a pre-pit reproduction circuit 8, a wobble reproduction circuit 9, a data reproduction circuit 10, a reproduction clock generation circuit 11, a pre-pit window protection circuit 12, a pre-pit sync detection circuit 13, a pre-pit demodulation circuit 14, a pre-pit address extraction circuit 15, a data sync detection circuit 16, a data sync window protection circuit 17, an 8–16 demodulation circuit 18, a data ID extraction circuit 19, a recording clock generation circuit 20, a lock detection circuit 21, a system controller 22, a recording control circuit 23, an error correction circuit 24, and an 8–16 modulation circuit 25.

The motor driver 4 drives the spindle motor 2 so as to cause the optical disc 1 to rotate at a prescribed rotation frequency.

The pickup 3 directs a light beam having a prescribed reproduction power to the optical disc 1. The light beam output from the pickup 3 is driven by a driving signal which output from the light beam driving circuit 6. The light beam driving circuit 6 is control led based on a reproduction power control signal which is output from the power control circuit 5.

The light beam directed to the optical disc 1 is reflected by the optical disc 1 and is incident on the pickup 3. The light reflected by the optical disc 1 has properties in accordance with the optical and physical characteristics of a recording film of the optical disc 1 reflecting the light beam.

The pickup 3 includes a plurality of light receiving circuits (not shown). Each receiving circuit converts the amount of reflected light incident thereon into an electric signal.

The reproduction amplification circuit 7 adds all the electric signals obtained as a result of conversion performed by the receiving circuits and amplifies the resultant sum, so as to generate an RF (Radio Frequency) signal. The reproduction amplification circuit 7 obtains a difference signal representing a difference in amplitude between electric signals obtained by light receiving circuits having a border therebetween substantially parallel to the track of the optical disc 1. The reproduction amplification circuit 7 then amplifies the difference signal, so as to generate a push-pull signal.

The pre-pit reproduction circuit 8 includes a comparator (not shown) for comparing the level of a push-pull signal and a prescribed slicing level. When the level of the push-pull signal is higher than the prescribed slicing level, the comparator outputs a H-level signal. When the level of the push-pull signal is lower than the prescribed slicing level, the comparator outputs a L-level signal. Thus, pre-pit reproduction circuit 8 outputs a pulse-like pre-pit signal. The prescribed slicing level is set so as to be substantially the median between the maximum level of land pre-pit portion of the push-pull signal and the maximum level of the wobble portion of the push-pull signal.

The wobble reproduction circuit 9 includes a BPF (Band Pass Filter; not shown) for allowing a wobble frequency component (around 140.6 kHz at the standard speed of the DVD-R/RW) to pass, and a comparator (not shown) for comparing the level of a signal after a noise component and a land pre-pit component are removed by the BPF with a prescribed slicing level. When the level of the signal is higher than the prescribed slicing level, the comparator outputs a H-level signal. When the level of the signal is lower than the prescribed slicing level, the comparator outputs a L-level signal. Thus, the wobble reproduction circuit 9 outputs a rectangular wave-shaped wobble signal representing the frequency of the wobbles. The prescribed slicing level is set so as to be substantially the median of the amplitude of the wobble signal.

The data reproduction circuit 10 includes a comparator (not shown) for comparing the level of an RF signal and a prescribed slicing level. When the level of the RF signal is higher than the prescribed slicing level, the comparator outputs a H-level signal. When the level of the RF signal is lower than the prescribed slicing level, the comparator outputs a L-level signal. Thus, the data reproduction circuit 10 outputs a rectangular wave-shaped data reproduction signal. The prescribed slicing level is set so that a value obtained by integrating the H-level of a level-sliced RF signal in a prescribed period is substantially equal to a value obtained by integrating the L-level of the level-sliced RF signal in the prescribed period.

The reproduction clock generation circuit 11 generates a reproduction clock having a frequency corresponding to the length of 1T as follows. The reproduction clock generation circuit 11 controls the frequency of a reproduction clock so that the minimum length in which the data reproduction signal can maintain the H-level or L-level (3T) includes 3 cycles of the reproduction clock and so that the maximum length in which the data reproduction signal can maintain the H-level or L-level (14T) includes 14 cycles of the reproduction clock.

The pre-pit window protection circuit 12 predicts the timing at which the next pre-pit signal is output from the pre-pit reproduction circuit 8 based on the timing at which the previous pre-pit signal was output from the pre-pit reproduction circuit 8. The pre-pit window protection circuit 12 then eliminates pre-pit signals which are output at timings other than the predicted timing. Thus, the number of times of erroneous detection of the pre-pit can be reduced.

The pre-pit sync detection circuit 13 extracts, among pre-pit signals output from the pre-pit window protection circuit 12, a pre-pit sync detection signal corresponding to a prescribed pre-pit (for example, a land pre-pit pre-formed in correspondence with the leading frame (frame 0) of the sector).

The pre-pit window protection circuit 12 may be omitted. Regardless of whether or not the optical disc apparatus 100 includes the pre-pit window protection circuit 12, the pre-pit sync detection circuit 13 operates to detect a prescribed pre-pit pre-formed on the optical disc 1 (for example, a land pre-pit pre-formed in correspondence with the leading frame (frame 0) of the sector) and to output a pre-pit sync detection signal in response to the detection of the prescribed pre-pit.

The pre-pit demodulation circuit 14 converts the pre-pit signal in synchronization with the pre-pit sync detection signal in accordance with Table 1. Thus, LPP information including a 4-bit RA (Relative Address) and 8-bit data is obtained.

The pre-pit address extraction circuit 15 stores, in a memory, data included in the LPP information based on the RA included in the LPP information, performs a prescribed error correction for the data stored in the memory, and extracts a pre-pit address from the data stored in the memory.

The data sync detection circuit 16 synchronizes the data reproduction signal at the timing of the reproduction clock so as to detect a prescribed synchronization signal included in the data recorded on the optical disc 1, and then outputs a data sync detection signal in response to the detection of the prescribed synchronization signal. Here, the prescribed synchronization signal included in the data recorded on the optical disc 1 is, for example, a sync code including "a recording mark having a length of 14T and a space having a length of 4T" or a sync code including "a space having a length of 14T and a recording mark having a length of 4T".

The data sync window protection circuit 17 predicts the timing at which the next data sync detection signal is output from the data sync detection circuit 16 based on the timing at which the previous data sync detection signal was output from the data sync detection circuit 16. The data sync window protection circuit 17 then eliminates data sync detection signals which are output at timings other than the predicted timing. Thus, the number of occurrences of erroneous detection of the prescribed synchronization signal included in the data recorded on the optical disc 1 (for example, sync code) can be reduced.

The 8–16 demodulation circuit 18 performs 8–16 demodulation of the data reproduction signal in response to the data sync detection signal which is output from the data sync window protection circuit 17. Then, the 8–16 demodulation circuit 18 outputs demodulated data.

The data sync window protection circuit 17 may be omitted. When the data sync window protection circuit 17 is omitted, the 8–16 demodulation circuit 18 can perform 8–16 demodulation of the data reproduction signal in response to the data sync detection signal which is output from the data sync detection circuit 16, and then output demodulated data.

The data ID extraction circuit 19 extracts a data ID from the demodulated data.

The recording clock generation circuit 20 generates a recording clock, and also detects a time-wise amount of deviation between the pre-pit sync detection signal and the data sync detection signal. The recording clock generation circuit 20 controls the frequency of the recording clock so as to correct the detected time-wise amount of deviation. The recording clock generation circuit 20 will be described in more detail later.

The lock detection circuit 21 detects that the frequency of the recording clock is stable in a prescribed range and outputs a lock signal.

The system controller 22 refers to the extracted pre-pit address or data ID to check whether or not the pickup 3 has reached such a position as to allow data to be recorded. When the system controller 22 confirms that the pickup 3 has reached such a position and further detects the lock signal which indicates that the frequency of the recording clock is stable, the system controller 22 instructs the recording control circuit 23 to record data.

The recording control circuit 23 control a recording operation based on the instruction from the system controller 22. Specifically, this operation is performed as follows. The system controller 22 determines whether or not the data is recorded immediately before an assumed recording starting point. In the case where no data is recorded immediately before the assumed recording starting point, the recording control circuit 23 determines an actual recording starting point based on the pre-pit signal. In the case where data is recorded immediately before the assumed recording starting point, the recording control circuit 23 determines an actual recording starting point based on the data sync detection signal.

Whether data is recorded immediately before the recording starting position or not is determined by, for example, referring to TOC information which is recorded in a lead-in area. Alternatively, whether data is recorded immediately before the recording starting position or not is determined in accordance with whether or not the amplitude of the RF signal is equal to or greater than a prescribed level. Still alternatively, whether data is recorded immediately before the recording starting position or not is determined in accordance with whether or not the synchronization signal is detected a prescribed number of times or more.

In the case where the data is recorded immediately before the assumed recording starting point, the actual recording starting point is determined based on the data sync detection signal. In this manner, new data can be recorded so as to be continuous from the recorded data. Thus, the recording control circuit 23, together with the error correction circuit 14, the 8–16 modulation circuit 25, the power control circuit 5, the light beam driving circuit 6 and the pickup 3 can act as a recording section for recording new data on the optical disc 1 so as to be continuous from the recorded data.

The recording control circuit 23 outputs a recording gate signal. For example, an activated state (H level) of the recording gate signal indicates that recording is permitted, and an inactivated state (L level) of the recording gate signal-indicates that recording is prohibited. In this case, the point at which the recording gate signal is transited from the inactivated state (L level) to the activated state (H level), i.e., the rising edge of the recording gate signal, corresponds to the recording starting point.

When the recording gate signal is activated, the error correction circuit 24 adds an error correction code to the data to be recorded. The 8–16 modulation circuit 25 modulates the signal which is output from the error correction circuit 24, and outputs the resultant modulated signal in synchronization with the recording clock.

When the recording gate signal is activated, the power control circuit 5 outputs a recording power control signal to the light beam driving circuit 6.

The light beam driving circuit 6 converts the level-sliced modulated signal to a driving signal having a prescribed pulse pattern based on a prescribed light strategy, and outputs the driving signal.

The pickup 3 directs the light beam in accordance with the driving signal to the optical disc 1 and thus changes the optical characteristics of the recording film so as to form a recording mark.

Hereinafter, the recording clock generation circuit 20 will be described in more detail.

As shown in FIG. 1, the recording clock generation circuit 20 includes a first timing signal generator 26, a second timing signal generator 27, a phase difference detector 28, a filter 29 and a PLL (Phase-Locked Loop) 30.

The first timing signal generator 26 generates a first rectangular wave in synchronization with the recording clock, based an the pre-pit sync detection signal. The first rectangular wave is generated using, for example, a counter (first counter), the counting value of which is incremented one by one in synchronization with the recording clock. The counting value of the first counter is preset to a prescribed value (A) in response to the pre-pit sync detection signal regardless of the state of the recording clock (activated state or inactivated state). When the counting value of the first counter reaches a prescribed value (B) the first timing signal generator 26 changes the level of the first rectangular wave from the H level to the L level. When the counting value of the first counter reaches a prescribed value (C), the first timing signal generator 26 changes the level of the first rectangular wave from the L level to the H level.

When the counting value of the first counter reaches a prescribed value (D), the counting value of the first counter is reset to "0". Thereafter, the counting value of the first counter is again incremented one by one in synchronization with the recording clock. Thus, the first rectangular wave having an alternately changing level between the H level and the L level is output from the first timing signal generator 26.

The second timing signal generator 27 generates a second rectangular waves in synchronization with the recording clock, based on the data sync detection signal. The second rectangular wave is generated using, for example, a counter (second counter), the counting value of which is incremented one by one in synchronization with the recording clock. The counting value of the second counter is preset to a prescribed value (E) in response to the data sync detection signal only when the recording clock is in an inactivated state. When the counting value of the second counter reaches the prescribed value (B), the second timing signal generator 27 changes the level of the second rectangular wave from the H level to the L level. When the counting value of the second counter reaches the prescribed value (C), the second timing signal generator 27 changes the level of the second rectangular wave from the L level to the H level.

When the counting value of the second counter reaches the prescribed value (D), the counting value of the second counter is reset to "0". Thereafter, the counting value of the second counter is again incremented one by one in synchronization with the recording clock. Thus, the second rectangular wave having an alternately changing level between the H level and the L level is output from the second timing signal-generator 27.

The prescribed values (A) and (E) are preset so that the phase difference between the first rectangular wave and the second rectangular wave is substantially zero when new data is recorded on an ideal position on the groove track (i.e., the position of the new data which is recorded so that the circumferential position on the groove track, at which the center of the 14T-long mark or space included in the sync code of the new data is located, matches the circumferential position of the land pre-pit on the land track adjacent to the groove track). In this specification, "substantially zero" refers to a range, including 0, which can be permitted from the viewpoint of the design of the optical disc apparatus 100.

The prescribed value (D) is preset so as to be equal to a multiple of the length of one cycle of wobbles.

As can be appreciated from the above, the first timing signal generator 26 and the second timing signal generator 27 act as a detection section for detecting an amount of deviation between the position of data which is already recorded on the optical disc 1 and the position at which the data should have been recorded. The position of data which is already recorded on the optical disc 1 is detected based on, for examples the data sync detection signal. The position at which the data should have been recorded is detected based on, for example, the pre-pit sync detection signal.

The phase difference detector 28 outputs a first phase difference signal representing the difference between the first rectangular wave and the second rectangular wave. The phase difference detector 28 maybe constructed to be operable only when the recording gate signal is in an activated state.

The filter 29 restricts the time-wise change amount of the first phase difference signal, and outputs the first phase difference signal having the restricted time-wise change amount as a correction amount signal to the PLL 30. The time-wise change amount of the first phase difference signal is restricted in order to adjust a response speed so that a data reproduction PLL for reproducing data recorded by the optical disc apparatus 100 can generate a reproduction clock sufficiently quickly. Therefore, when such response speed adjustment is not necessary, the filter 29 may be omitted. The filter 29 can be realized by, for example, an LPF (Low Pass Filter).

The PLL 30 controls the frequency of the recording clock so that the level of the correction amount signal is substantially zero (i.e., so that the phase difference between the first rectangular wave and the second rectangular wave approaches "0" or is substantially "0").

As can be appreciated from the above, the phase difference detector 28, the filter 29 and the PLL 30 act as a control circuit for controlling the frequency of the recording clock so that the phase difference between the first rectangular wave and the second rectangular wave approaches "0" or is substantially "0".

The phase difference detector 28, the filter 29 and the PLL 30 also act as an adjustment section for adjusting the position at which the new data is to be recorded on the optical disc 1 having data already recorded thereon. The adjustment is performed so that even when the position of the already recorded data is deviated from the position at which the data should have been recorded, the position of the end of the new data matches the position at which the end of the new data should be recorded (i.e., so that the deviation between the position at which the end of the new data is actually recorded and the position at which the end of the new data should be recorded is substantially zero). The position at which the new data in to be recorded can be adjusted by, for example, adjusting the frequency of the recording clock.

The adjustment section may adjust the position at which the new data is to be recorded so that the deviation between the position at which the end of the new data is actually recorded and the position at which the end of the new data should be recorded is smaller than the deviation between the position of data which is already recorded on the optical disc 1 and the position at which the data should have been recorded.

In the case where the optical disc apparatus 100 includes a reference frequency detection section for detecting a reference frequency of the recording clock, the adjustment section may control the frequency of the recording clock so that the frequency of the recording clock is closer to the reference frequency. For example, the wobble reproduction circuit 9 (FIG. 1) may act as the reference frequency detection section, because the frequency of the wobble signal output from the wobble reproduction circuit 9 can be used as the reference frequency of the recording clock.

Figure 2:
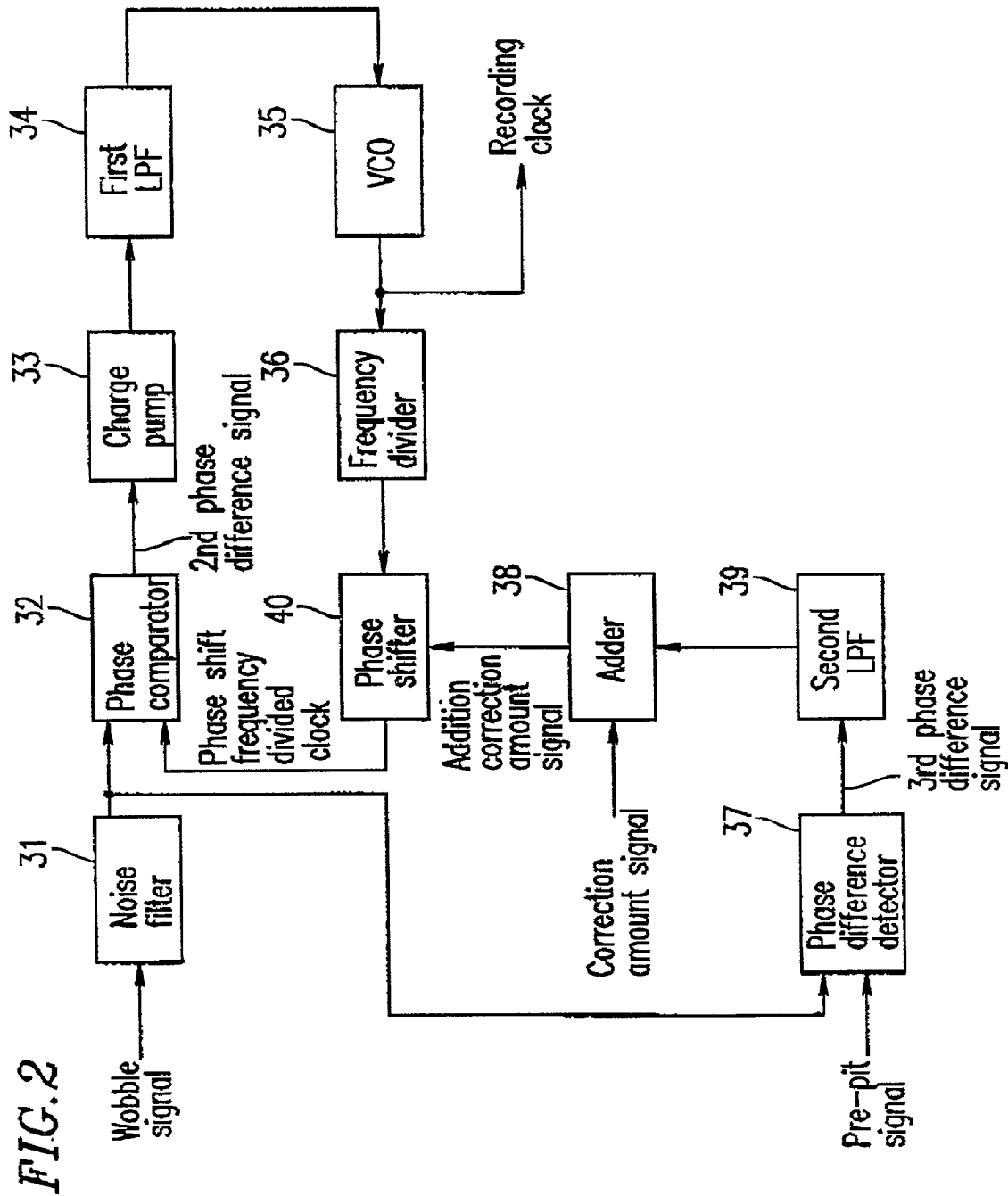
FIG. 2 is a block diagram illustrating a structure of a PLL 30 included in the optical disc apparatus 100 shown in FIG. 1.

FIG. 2 shows a structure of the PLL 30.

The PLL 30 includes a noise filter 31, a phase comparator 32, a charge pump 33, a first LPF 34, a VCO (Voice-Controlled Oscillator) 35, a frequency divider 36, a phase difference detector 37, an adder 38, a second LPF 39, and a phase shifter 40.

The noise filter 31 removes H pulses and L pulses, included in the wobble signal, having an amplitude equal to or less than a prescribed level as noise.

The phase comparator 32 compares the phase of the wobble signal after the noise is removed with the phase of the phase shift frequency divided clock which is output from the phase shifter 40, and outputs a second phase difference signal representing the phase difference therebetween.

The charge pump 33 converts the second phase difference signal to a voltage level signal. The first LPF 34 removes a high frequency component from the voltage level signal. The voltage level signal after the high frequency component is removed is input to the VCO 35.

The VCO 35 oscillates at the frequency corresponding to the voltage level signal so as to generate a recording clock.

The frequency divider 36 outputs a frequency divided clock obtained by dividing the frequency of the recording clock by 186.

The phase difference detector 37 detects the phase difference between the pre-pit signal and the wobble signal each time the pre-pit signal is input, and outputs a third phase difference signal representing the detected phase difference.

The second LPF 39 removes a high frequency component from the third phase difference signal and outputs the resultant third phase difference signal with the ti me-wise change amount being restricted.

The adder 38 adds the signal output from the second LPF 39 and the correction amount signal so as to generate an addition correction amount signal.

The phase shifter 40 shifts the phase of the frequency divided clock in accordance with the addition correction amount signal and thus outputs the phase shift frequency divided clock to the phase comparator 32.

Figure 3:
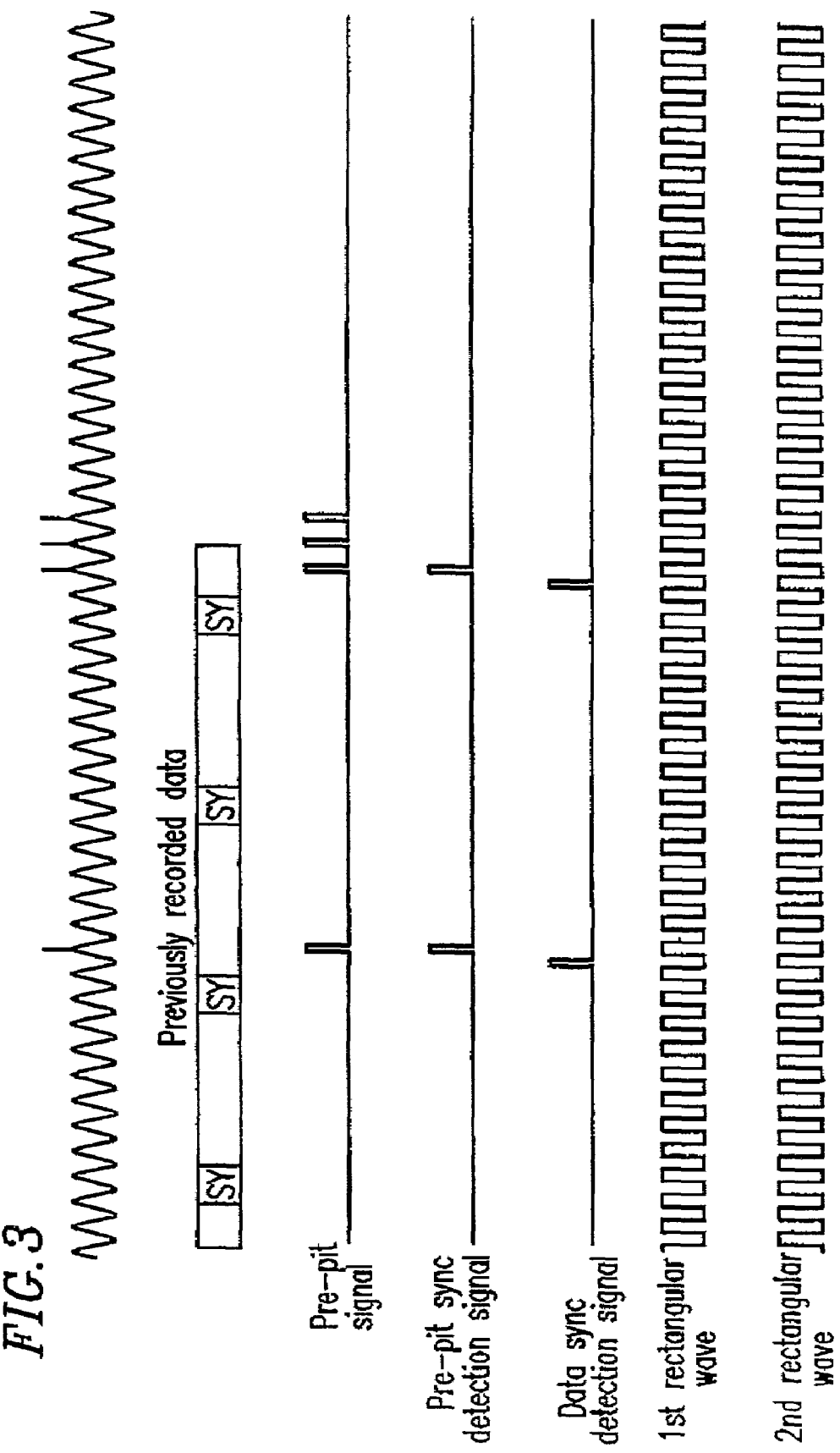
FIG. 3 is a waveform diagram illustrating exemplary wave form of a pre-pit signal, a pre-pit sync detection signal, and a data sync detection signal according to the present invention.
Figure 4:
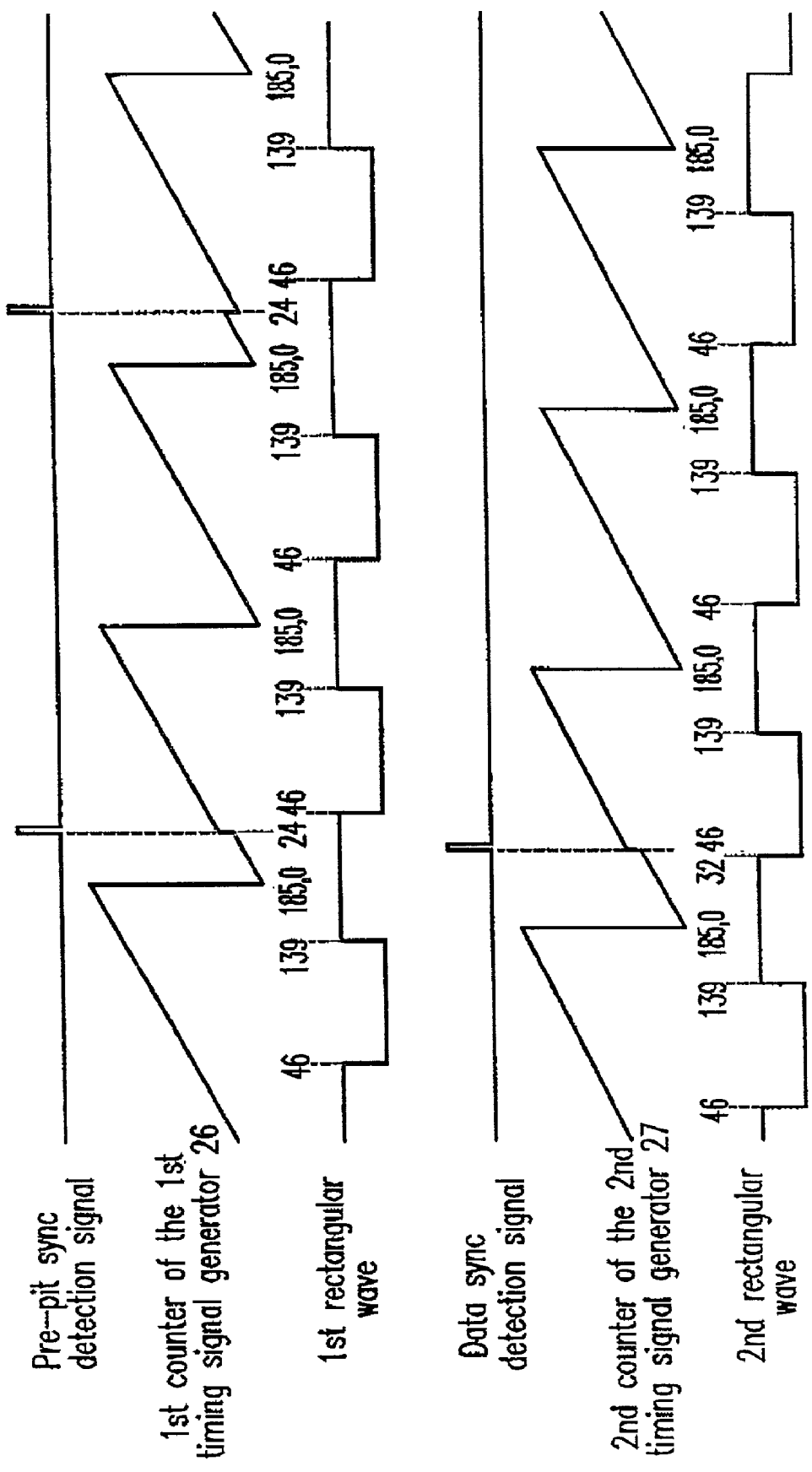
FIG. 4 shows exemplary operations of a first timing signal generator 26 and a second timing signal generator 27 according to the present invention.
Figure 5:
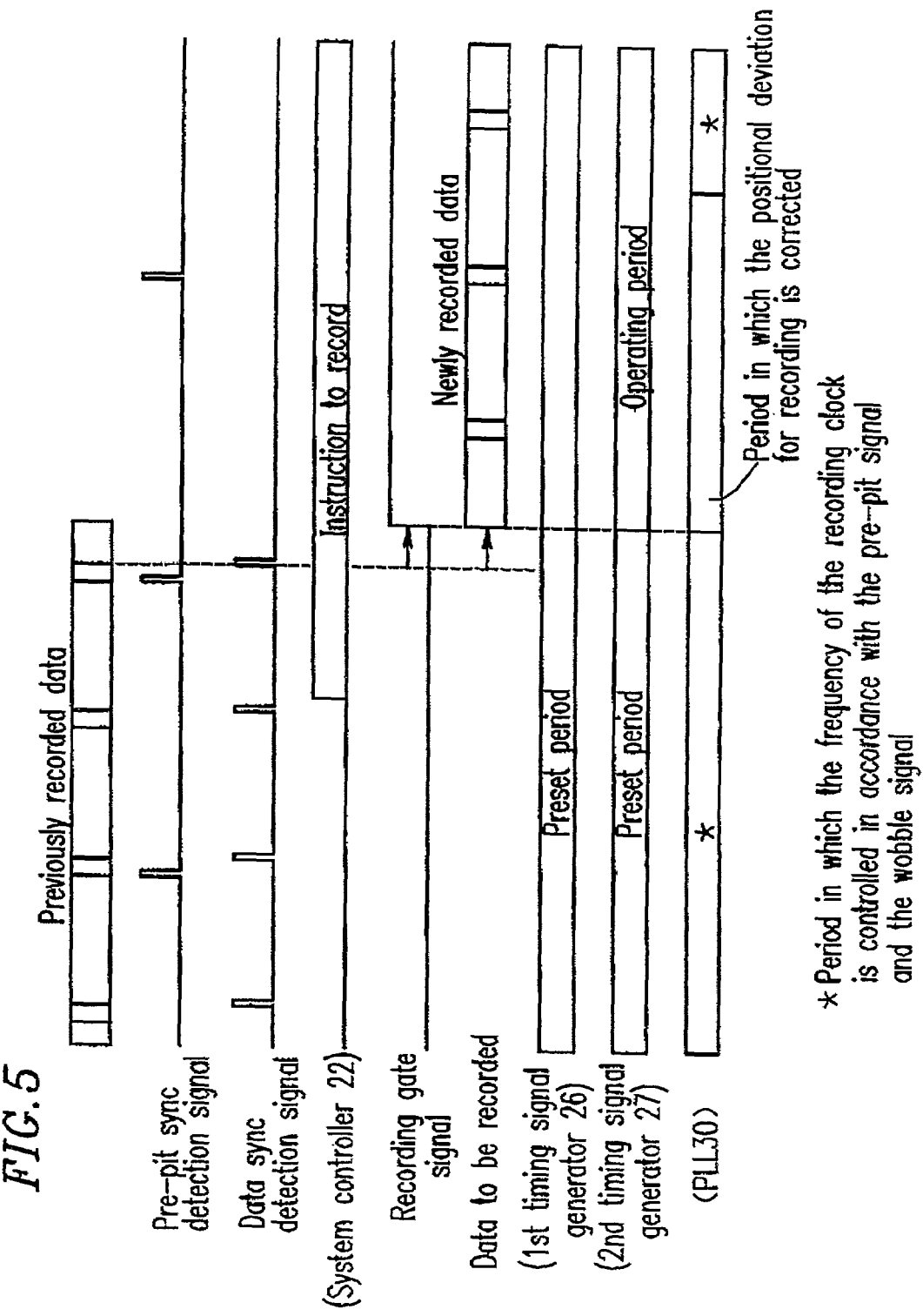
FIG. 5 shows waveforms of signals and operations of circuits according to the present invention.

With reference to FIGS. 3 through 5, an exemplary operation of the optical disc apparatus 100 for recording new data on the optical disc will be described. It is assumed that the optical disc 1 has data recorded at a position which is deviated from the position at Which the data should have been recorded. The optical disc apparatus 100 records the new data so that the newly recorded data is continuous to the already recorded data and so that the amounts of positional deviation are not accumulated.

FIG. 3 shows exemplary waveforms of the pre-pit signal, the pre-pit sync detection signal, the data sync detection signal, the first rectangular wave and the second rectangular wave, when the data is recorded on the optical disc 1 at a position which is deviated from the position at which the data should have been recorded.

The pre-pit signal is output from the pre-pit reproduction circuit 8 (FIG. 1). The pre-pit sync detection signal is output from the pre-pit sync detection circuit 13 (FIG. 1). The data sync detection signal is output from the data sync detection circuit 16 (FIG. 1).

The first timing signal generator 26 outputs the first rectangular wave based on the pre-pit sync detection signal. The second timing signal generator 27 outputs the second rectangular wave based on the data sync detection signal.

FIG. 4 shows an exemplary operation of the first timing signal generator 26 and the second timing signal generator 27 in the case shown in FIG. 3.

The counter (first counter) built in the first timing signal generator 26 increments the counter value thereof in synchronization with the recording clock. The counting value of the first counter is preset to "24" in response to the pre-pit sync detection signal. When the counting value of the first counter reaches "46", the first timing signal generator 26 changes the level of the first rectangular wave from the H level to the L level. When the counting value of the first counter reaches "139", the first timing signal generator 26 changes the level of the first rectangular wave from the L level to the H level.

When the counting value of the first counter reaches "185", the counting value of the first counter is reset to "0". Thereafter, the counting value of the first counter is again incremented one by one in synchronization with the recording clock. Thus, the first rectangular wave having an alternately changing level between the H level and the L level is output from the first timing signal generator 26. The cycle of the first rectangular wave is 186T. Accordingly, the first rectangular wave can be generated by the first timing signal generator 26 by dividing the frequency of the recording clock.

The counter (second counter) built in the second timing signal generator 27 increments the counter value thereof in synchronization with the recording clock. The counting value of the second counter is preset to "32" in response to the data sync detection signal, When the counting value of the second counter reaches "46", the second timing signal generator 27 changes the level of the second rectangular wave from the H level to the L level. When the counting value of the second counter reaches "139", the second timing signal generator 27 changes the level of the first rectangular wave from the L level to the H level.

When the counting value of the second counter reaches "185", the counting value of the second counter is reset to "0". Thereafter, the counting value of the second counter is again incremented one by one in synchronization with the recording clock. Thus, the second rectangular wave having an alternately changing level between the H level and the L level is output from the second timing signal generator 27. The cycle of the second rectangular wave is 186T. Accordingly, the second rectangular wave can be generated by the second timing signal generator 27 by dividing the frequency of the recording clock.

In the case where the position of the data recorded on the optical disc 1 matches the position at which the data should have been recorded (i.e., in the case where the data is recorded on the optical disc 1 with no positional deviation), the first rectangular wave and the second rectangular wave are adjusted to have a phase difference of substantially "0". Therefore, in the case where the position of the data recorded on the optical disc 1 is deviated forward with respect to the position at which the data should have been recorded, the second rectangular wave is output, as shown in FIG. 4, with the phase being deviated forward with respect to the phase of the first rectangular wave.

When prescribed conditions are fulfilled, the system controller 22 instructs the recording control circuit 23 to record data.

The recording control circuit 23 activates the recording gate signal in accordance with the instruction from the system controller 22, and also controls a recording circuit system (including the error correction circuit 24, the 8–16 modulation circuit 25, the power control circuit 5 and the light beam driving circuit 6) so that the new data is recorded on the optical disc 1 in synchronization with the recording clock based on the data sync detection signal.

The recording circuit system (including the error correction circuit 24, the 8–16 modulation circuit 25, the power control circuit 5 and the light beam driving circuit 6) records the new data in synchronization with the recording clock based on the data sync detection signal.

FIG. 5 shows waveforms of the signals and the operations of the circuits in the case shown in FIG. 3.

When the recording gate signal is activated, each circuit of the recording circuit system starts a recording operation, and the second counter in the second timing signal generator 27 is prohibited from being preset. Thus, when the position of the data recorded on the optical disc 1 is deviated forward with respect to the position at which the data should have been recorded, the second rectangular wave is output with the phase being deviated forward with respect to the phase of the first rectangular wave, immediately after the recording operation starts. After the recording operation starts, the phase difference between the first rectangular wave and the second rectangular wave changes in accordance with the correction amount of the recording position.

The phase difference detector 28 detects the phase difference between the first rectangular wave and the second rectangular wave, and thus outputs the first phase difference signal. The filter 29 outputs a correction amount signal obtained by restricting the time-wise change amount of the first phase difference signal.

Before the recording operation starts, the PLL 30 controls the frequency of the recording clock in accordance with the pre-pit signal and the wobble signal. After the recording operation starts, the PLL 30 adds the correction amount signal to the loop of the PLL 30, and thus controls the frequency of the recording clock in accordance with the correction amount signal as well as the pre-pit signal and the wobble signal. Specifically, when the second rectangular wave is output with the phase being deviated forward with respect to the phase of the first rectangular wave, the frequency of the recording clock can be controlled to be decreased. When, by contrast, the second rectangular wave is output with the phase being deviated rearward with respect to the phase of the first rectangular wave, the frequency of the recording clock can be controlled to be increased.

The above-described control operation of the recording clock is repeated until the deviation of the recording position is "0" (i.e., until the phase difference between the first rectangular wave and the second rectangular wave becomes zero). When the deviation of the recording position is eliminated, the PLL 30 is switched to operate to control the frequency of the recording clock in accordance with the pre-pit signal and the wobble signal.

The PLL 30 may control the frequency of the recording clock in accordance with the wobble signal instead of the pre-pit signal and the wobble signal.

As described above, the optical disc apparatus 100 according to the first example records the new data based on the data sync detection signal at the connection portion between the previously recorded data and the new data. Therefore, the continuity between the previously recorded data and the new data is guaranteed. Even when the position of the previously recorded data is deviated from the position at which the data should have been recorded, the optical disc apparatus 100 detects the amount of deviation and controls the frequency of the recording clock in accordance with the detected amount of deviation. Therefore, the deviation of the recording position does not remain.

In the above description, the PLL 30 controls the frequency of the recording clock in accordance with both the pre-pit signal and the wobble signal, but the present invention is not limited to this. It is not necessary that the pre-pit signal and the wobble signal are input to the PLL 30. It is sufficient that the PLL 30 can add a correction amount signal to the loop for generating a recording clock and control the frequency of the recording clock.

In the above description, the phase shift frequency divided clock, which is one input to the phase comparator 32, is further shifted in accordance with the correction amount signal. Alternatively, the wobble signal output from the noise filter 31, which is another input to the phase comparator 32, may be further shifted in accordance with the correction amount signal.

Still alternatively, after the correction amount signal is converted into a voltage level signal, the correction amount signal may be added to the output of the charge pump 33 in an analog manner. The same effect as above is provided.

Figure 6:
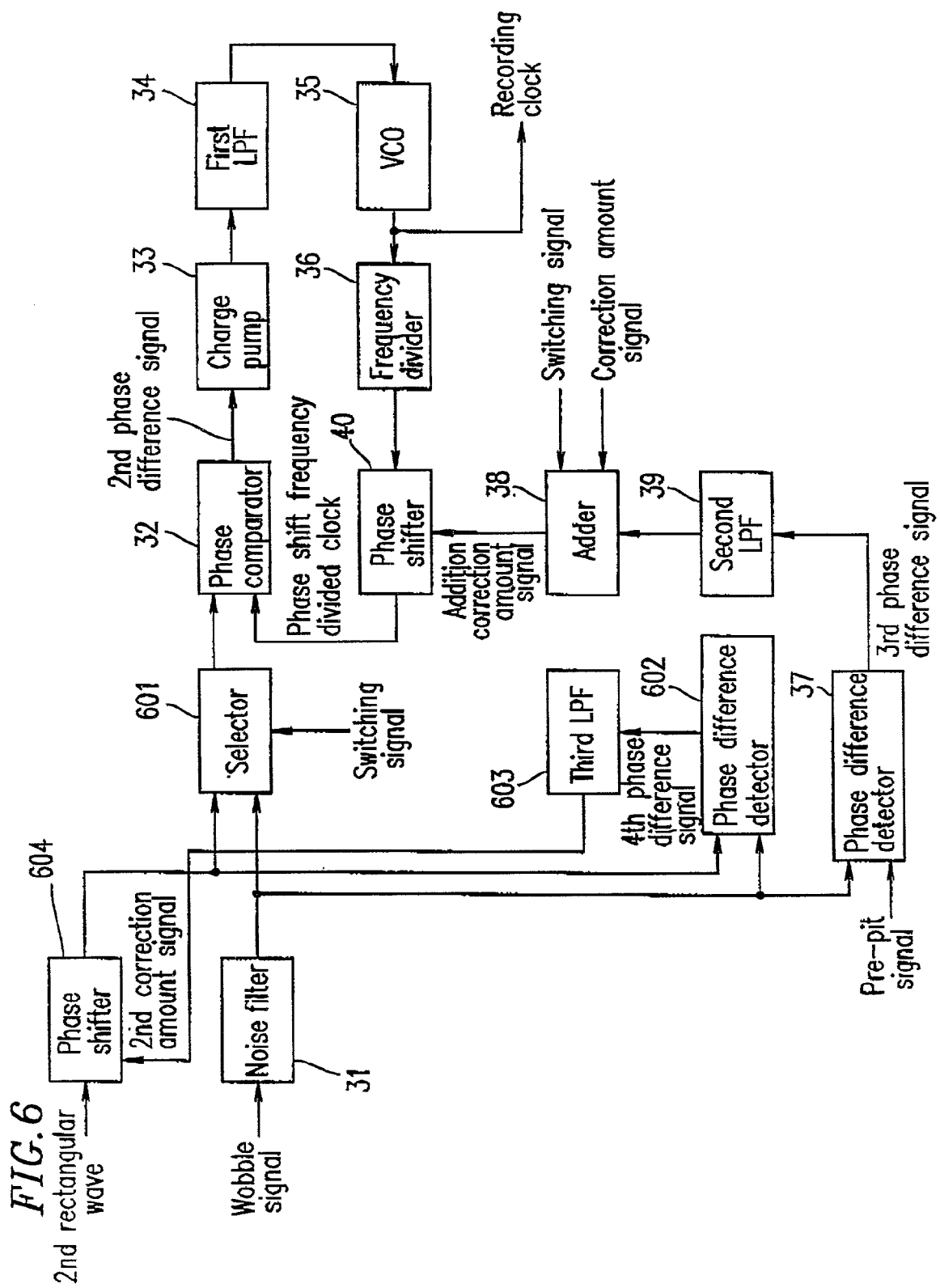
FIG. 6 is a block diagram illustrating another structure of the PLL 30 which can be included in the optical disc apparatus 100 shown in FIG. 1.

FIG. 6 shows another structure of the PLL 30.

In this example, as shown in FIG. 6, the PLL 30 includes a selector 601, a phase difference detector 602, a third LPF 603, and a phase shifter 604 in addition to the elements shown in FIG. 2. In the structure shown in FIG. 6, the PLL 30 can control the frequency of the recording clock also in accordance with the second rectangular wave.

The selector 601 selects either the second rectangular wave phase-shifted by the phase shifter 604 or the wobble signal output from the noise filter 31.

The phase difference detector 602 detects the phase difference between the second rectangular wave phase-shifted by the phase shifter 604 and the wobble signal output from the noise filter 31, and outputs a fourth phase difference signal representing the detected phase difference.

The third LPF 603 removes a high frequency component from the fourth phase difference signal, and outputs the resultant fourth phase difference signal with the time-wise change amount being restricted to the phase shifter 604 as a second correction amount signal.

The phase shifter 604 shifts the phase of the second rectangular wave in accordance with the second correction amount signal so that the phase of the second rectangular wave matches the phase of the wobble signal.

Figure 7:
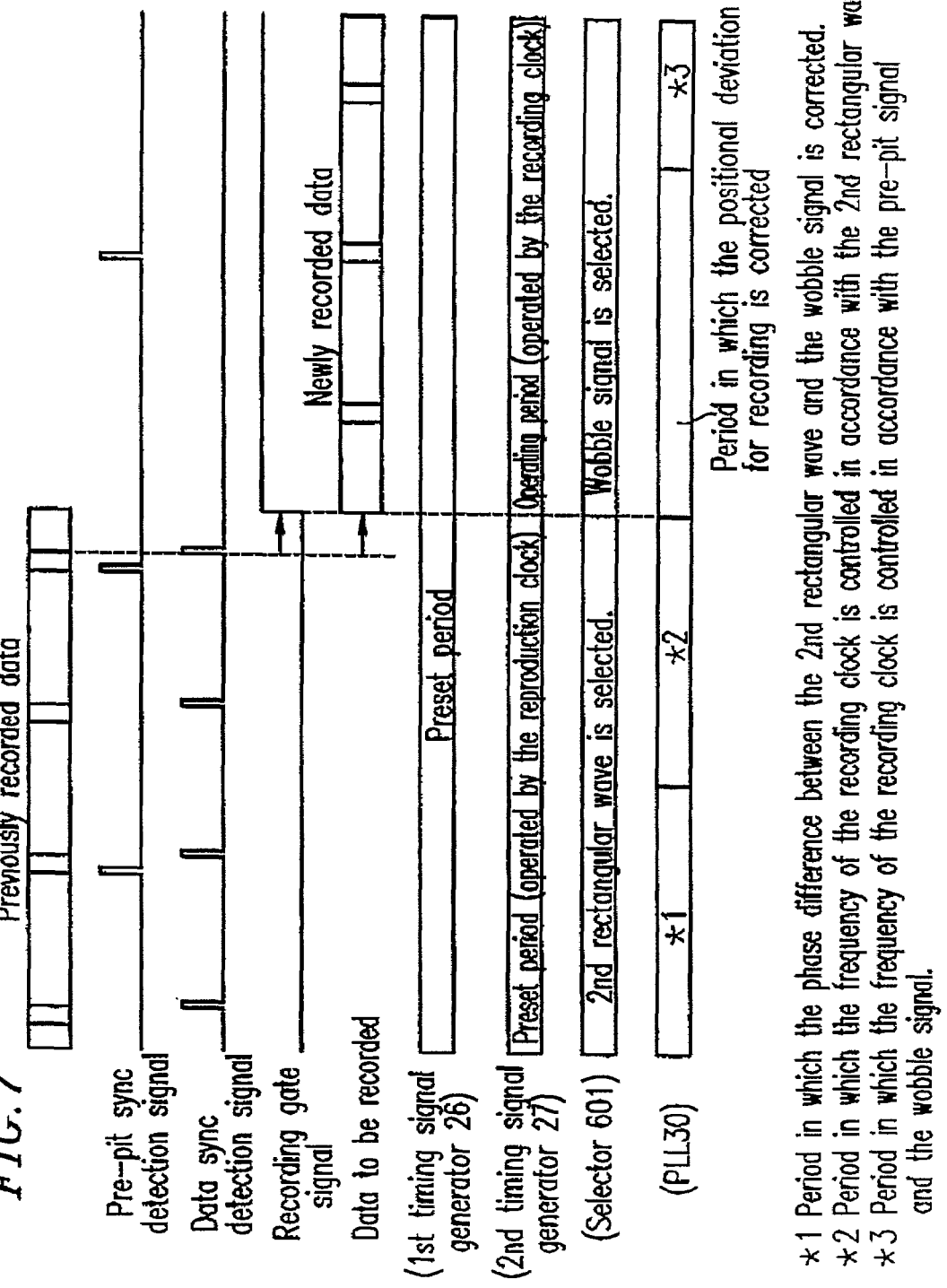
FIG. 7 shows waveforms of signals and operations of circuits according to the present invention.

FIG. 7 shows waveforms of the signals and the operations of the circuits in the case shown in FIG. 3.

Before the recording operation starts, the second counter built in the second timing signal generator 27 is operated in synchronization with a reproduction clock which is output from the reproduction clock generation circuit 11 (FIG. 1), and thus the second timing signal generator 27 outputs the second rectangular wave in synchronization with the reproduction clock.

Before the recording operation starts, the phase shifter 604 operates so as to correct the phase difference between the second rectangular wave and the wobble signal (for example, so that the phase of the second rectangular wave matches the phase of the wobble signal) in accordance with the second correction amount signal. This operation corresponds to the period marked with *1 in FIG. 7. When the correction of the phase difference between the second rectangular wave and the wobble signal is completed (for example, when the phase of the second rectangular wave matches the phase of the wobble signal), the selector 601 is controlled to select the second rectangular wave instead of the wobble signal. As a result, the PLL 30 operates to multiply the second rectangular wave obtained by dividing the frequency of the reproduction clock and thus to generate a recording clock. This operation corresponds to the period marked with *2 in FIG. 7, towing to this operation, a recording clock having an equal frequency to that of the reproduction clock can be obtained.

After the recording operation starts, the PLL 30 operates in substantially the same manner as described above with reference to FIG. 5.

Before the recording operation starts, the frequency of the recording clock can be controlled using the second rectangular wave generated based on the reproduction clock. After the recording operation starts, the deviation of the recording position can be corrected, and the frequency of the recording clock can be controlled in accordance with the pre-pit signal and the wobble signal. The recording clock it obtained in synchronization with the frequency of the reproduction clock which is obtained from the data recorded on the optical disc 1. Therefore, the difference in frequency between the data already recorded on the optical disc 1 and the new data can be reduced. As a result, the continuity in frequency can also be guaranteed between the data recorded on the optical disc 1 and the new data.

EXAMPLE 2

An optical disc apparatus 200 according to a second example of the present invention will be described with reference to FIGS. 8 and 9.

Figure 8:
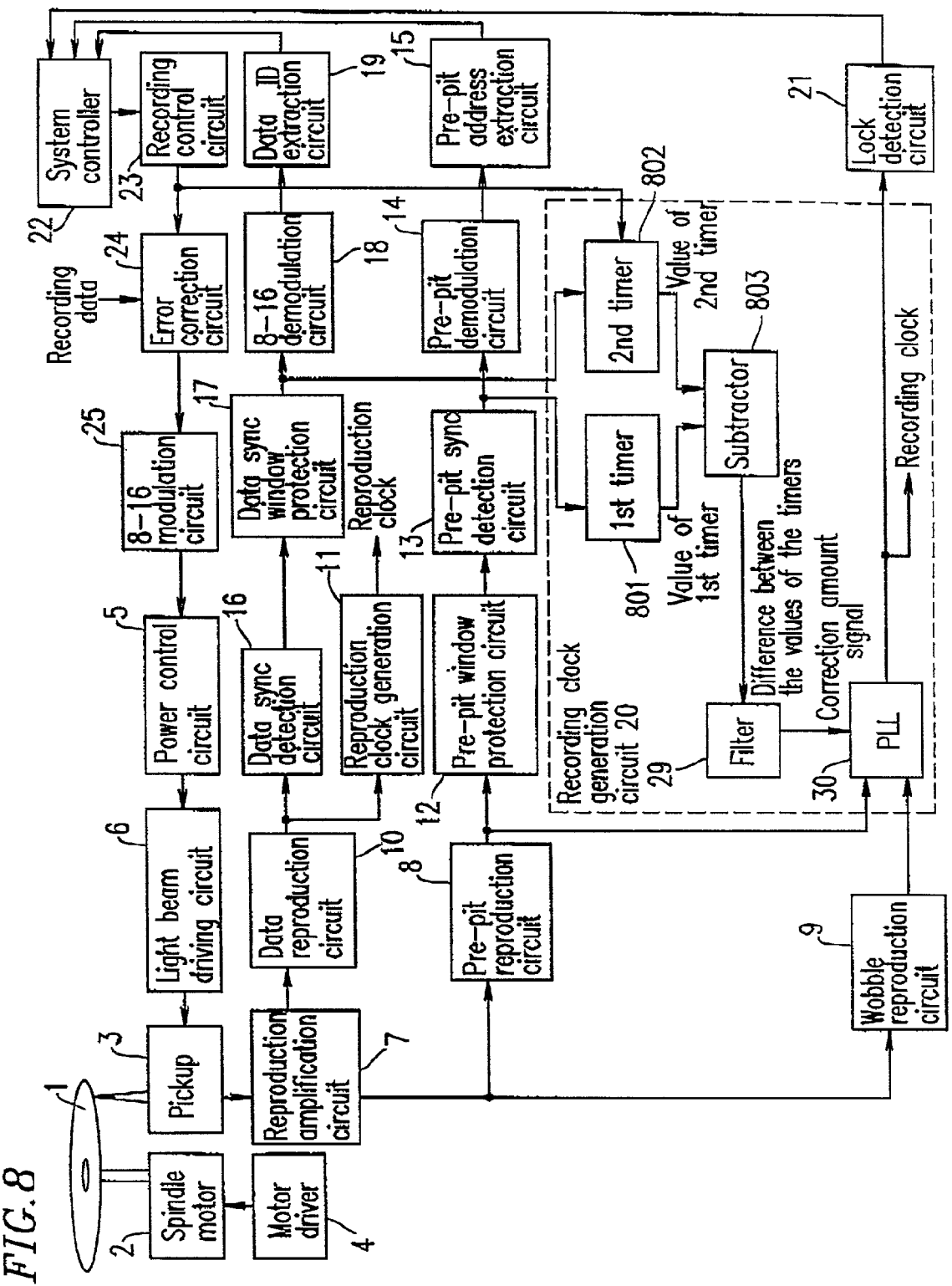
FIG. 8 is a block diagram illustrating a structure of an optical disc apparatus 200 according to a second example of the present invention.

FIG. 8 shows a structure of the optical disc apparatus 200.

As shown in FIG. 8, the optical disc apparatus 100 has substantially the same structure as that of the optical disc apparatus 100 (FIG. 1) except for the structure of the recording clock generation circuit 20.

The recording clock generation circuit 20 in the second example includes a first timer 801, a second timer 802, a subtractor 803, a filter 29 and a PLL 30.

Figure 9:
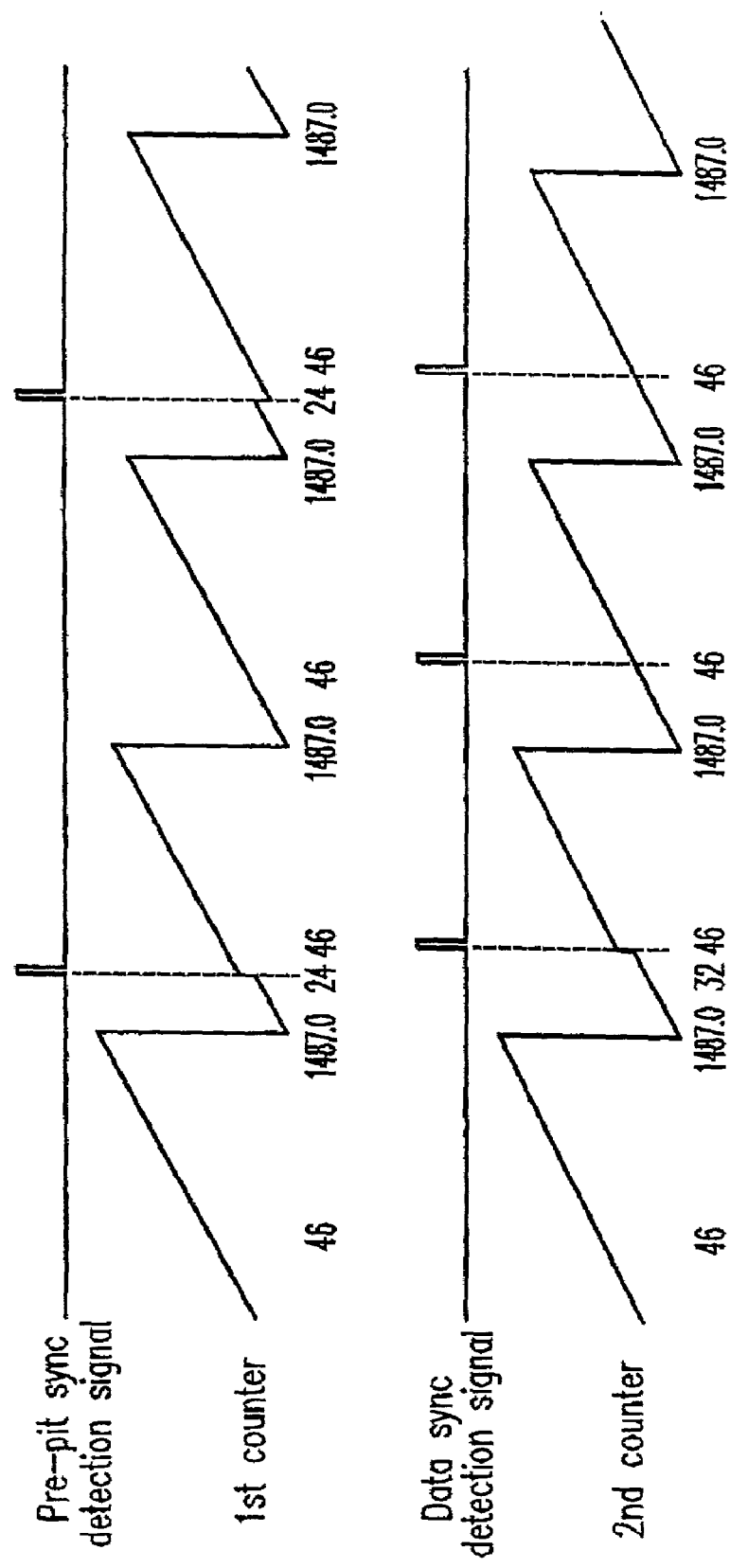
FIG. 9 shows exemplary operations of a first timer 801 and a second timer 802 according to the present invention.

FIG. 9 shows an exemplary operation of the first timer 801 and the second timer 802.

The first timer 801 includes a first counter, the counting value of which is incremented one by one in synchronization with the recording clock. The counting value of the first counter is preset to a prescribed value (F) in response to the pre-pit sync detection signal regardless of the state of the recording clock (activated state or inactivated state). The first timer 801 outputs the counting value of the first counter as the value of the first timer 801.

When the counting value of the first counter reaches 1488 corresponding to one frame, the counting value of the first counter is reset to "0". Thereafter, the counting value of the first counter is again incremented one by one in synchronization with the recording clock.

The second timer 802 includes a second counter, the counting value of which is incremented one by one in synchronization with the recording clock. The counting value of the second counter is preset to a prescribed value (G) in response to the data sync detection signal only when the recording clock is in an inactivated state. The second timer 802 outputs the counting value of the second counter as the value of the second timer 802.

When the counting value of the Second counter reaches 1488 corresponding to one frame, the counting value of the second counter is reset to "0". Thereafter, the counting value of the second counter is again incremented one by one in synchronization with the recording clock.

The preset value (prescribed value (F)) of the first timer 801 and the preset value (prescribed value (G)) of the second timer 802 are preset so that the value of the first timer 801 and the value of the second timer 802 is substantially zero when new data is recorded on an ideal position on the groove track (i.e., the position of the new data which is recorded so that the circumferential position on the groove track, at which the center of the 14T-long mark or space included in the sync code of the new data is located, matches the circumferential position of the land pre-pit on the land track adjacent to the groove track).

The subtractor 803 outputs a difference signal representing a difference between the value of the first timer 801 and the value of the second timer 802. The optical disc apparatus 200 may be structured so that the subtractor 803 operates only when the recording gate signal is in an activated state.

The filter 29 restricts the time-wise change amount of the difference signal output from the subtractor 803, and outputs the difference signal having the restricted time-wise change amount as a correction amount signal to the PLL 30. The time-wise change amount of the difference signal is restricted in order to adjust a response speed so that a data reproduction PLL for reproducing data recorded by the optical disc apparatus 200 can generate a reproduction clock sufficiently quickly. Therefore, when such response speed adjustment is not necessary, the filter 29 maybe omitted. The filter 29 can be realized by, for example, an LPF.

The PLL 30 controls the frequency of the recording clock so that the level of the correction amount signal approaches "0" or is substantially zero (i.e., so that the difference between the value of the first timer 801 and the value of the second timer 802 approaches "0" or is substantially "0").

As can be appreciated from the above, the subtractor 803 and the filter 29 act as a control circuit for controlling the frequency of the recording clock so that the difference between the value of the first timer 801 and the value of the second timer 802 approaches "0" or is substantially "0".

The structure of the PLL 30 is substantially the same as that of the PLL 30 described in the first example (FIG. 1).

As described above, the optical disc apparatus 200 according to the second example records the new data based on the data sync detection signal at the connection portion between the previously recorded data and the new data. Therefore, the continuity between the previously recorded data and the new data is guaranteed. Even when the position of the previously recorded data is deviated from the position at which the data should have been recorded, the optical disc apparatus 200 detects the amount of deviation and controls the frequency of the recording clock in accordance with the detected amount of deviation. Therefore, the deviation of the recording position does not remain.

The correction amount is derived by calculating the value of the first timer 801 and the value of the second timer 802. Therefore, the recording clock generation circuit 20 can be structured au a digital circuit. The functions of, for example, the subtractor 803 and the filter 29 may be implemented as software. This allows the circuit scale to be reduced and also allows the filter characteristics to be easily variable.

In one embodiment of the present invention, new data is recorded on an optical disc so as to be continuous from the data already recorded thereon. Thus, continuity between the previously recorded data and the newly recorded data is guaranteed. Even when the position of the previously recorded data is deviated from the position at which the data should have been recorded, the position at which the new data is to be recorded is adjusted so as to be as follows: the amount of deviation between the position at which the end of the new data is recorded and the position at which the end of the new data should be recorded is smaller than the amount of deviation between the position at which the previously recorded data is recorded and the position at which the previously recorded data should have been recorded. By such adjustment, the amounts of deviation of recording position is prevented from being accumulated.

In another embodiment of the present invention, new data is recorded on an optical disc Which has data already recorded thereon, based on a data sync detection signal. Thus, continuity between the previously recorded data and the newly recorded data is guaranteed. The time-wise deviation between the pre-pit sync detection signal and the data sync detection signal is detected, and the frequency of the recording clock is controlled so as to correct the time-wise deviation. By such control, the amounts of deviation of recording position is prevented from being accumulated.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An optical disc apparatus, comprising:
   a recording section for recording new data on an optical disc so as to be continuous to data which is previously recorded on the optical disc;
   a detection section for detecting an amount of deviation between a position at which the previously recorded data is recorded and a position at which the previously recorded data should have been recorded; and
   an adjustment section for adjusting a position at which the new data is to be recorded so that an amount of deviation between a position at which an end of the new data is to be recorded and a position at which the end of the new data should be recorded is smaller than the amount of deviation detected by the detection section.

2. An optical disc apparatus according to claim 1, wherein the adjustment section adjusts the position at which the new data is to be recorded so that the amount of deviation between the position at which the end of the new data is to be recorded and the position at which the end of the new data should be recorded is substantially zero.

3. An optical disc apparatus according to claim 1, wherein:
   the recording section records the new data on the optical disc in synchronization with a recording clock; and
   the adjustment section adjusts a frequency of the recording clock so as to adjust the position at which the new data is to be recorded.

4. An optical disc apparatus according to claim 1, further comprising reference frequency detection section for detecting a reference frequency of the recording clock, wherein the adjustment section control the frequency of the recording clock so that the frequency of the recording clock approaches the reference frequency.

5. An optical disc apparatus, comprising:
   a pre-pit sync detection circuit for detecting a prescribed pre-pit pre-formed on an optical disc and outputting a pre-pit sync detection signal in response to detection of the prescribed pre-pit;
   a data sync detection circuit for detecting a prescribed synchronization signal included in the previously recorded data and outputting a data sync detection signal in response to detection of the synchronization signal;
   a recording clock generation circuit for generating a recording clock; and
   a recording circuit system for recording the new data on the optical disc in synchronization with the recording clock based on the data sync detection signal,
   wherein the recording clock generation circuit detects a time-wise amount of deviation between the pre-pit sync detection signal and the data sync detection signal and controls a frequency of the recording clock so as to correct the detected time-wise amount of deviation.

6. An optical disc apparatus according to claim 5, wherein the recording clock generation circuit includes:
   a first timing signal generator for generating a first rectangular wave in synchronization with the recording clock based on the pre-pit sync detection signal;
   a second timing signal generator for generating a second rectangular wave in synchronization with the recording clock based on the data sync detection signal; and
   a control circuit for controlling the frequency of the recording clock so that a phase difference between the first timing signal and the second timing signal approaches zero.

7. An optical disc apparatus according to claim 6, wherein:
   the first timing signal generator generates the first rectangular wave by dividing the frequency of the recording clock, and
   the second timing signal generator generates the second rectangular wave by dividing the frequency of the recording clock.

8. An optical disc apparatus according to claim 5, wherein the recording clock generation circuit includes:
   a first timer which is preset at a first prescribed value in response to the pre-pit sync detection signal;
   a second timer which is preset at a second prescribed value in response to the data sync detection signal; and
   a control circuit for controlling the truancy of the recording clock so that a difference between a value of the first timer and a value of the second timer approaches zero.

9. An optical disc apparatus according to claim 8, wherein the first timer and the second timer operate in synchronization with the recording clock.

10. An optical disc apparatus according to claim 5, wherein the optical disc has a track formed thereon having wobbles of a prescribed cycle, the optical disc apparatus further comprising a wobble detection circuit for detecting the wobbles and outputting a wobble signal representing a frequency of the wobbles, wherein the recording clock generation circuit controls the frequency of the recording clock in accordance with the wobble signal.

11. An optical disc apparatus according to claim 10, wherein the recording clock generation circuit controls the frequency of the recording clock in accordance with the wobble signal before recording of the new data is started; and controls the frequency of the recording clock in accordance with the wobble signal and the detected time-wise amount of deviation after the recording of the new data is started.

12. An optical disc apparatus according to claim 10, further comprising a reproduction clock generation circuit for generating a reproduction clock from the previously recorded data, wherein the recording clock generation circuit controls the frequency of the recording clock in accordance with the reproduction clock before recording of the new data is started; and controls the frequency of the recording clock in accordance with the wobble signal and the detected time-wise amount of deviation after the recording of the new data is started.

13. An optical disc apparatus according to claim 1, wherein:
   the detection section comprises a first timing signal generator and a second timing signal generator;
   the position at which the previously recorded data is recorded is detected based on a data sync detection signal; and
   the position at which the previously recorded data should have been recorded is detected based on a pre-pit sync detection signal.

* * * * *

UNITED STATES PATENT AND TRADEMARK OFFICE
CERTIFICATE OF CORRECTION

PATENT NO. : 7,012,865 B2
APPLICATION NO. : 10/136068
DATED : March 14, 2006
INVENTOR(S) : Hironori Deguchi, Makoto Usui and Kohei Nakata It is certified that error appears in the above-identified patent and that said Letters Patent is hereby corrected as shown below:

Column 20, line 22, "truancy" should read -- frequency --.

Signed and Sealed this

Twenty-first Day of November, 2006

JON W. DUDAS
*Director of the United States Patent and Trademark Office*